United States Patent Office 2,996,543
Patented Aug. 15, 1961

2,996,543
ACYLATION OF AMINES
Robert C. Kinstler, Middlesex, N.J., assignor to American Cyanamid Company, New York, N.Y., a corporation of Maine
No Drawing. Filed Dec. 23, 1957, Ser. No. 704,322
6 Claims. (Cl. 260—558)

This invention relates to the acylation of amines and, more particularly, to the acylation of amines by the reaction of an aromatic acyl chloride with an amine.

The most common method for the acylation of amines is by the procedure generally known as the Schotten-Baumann method. In using this method according to this invention an aqueous solution containing an alkaline reagent such as sodium hydroxide or sodium carbonate and the amine dissolved in the organic phase make up a two phase organic solvent-aqueous alkali system. An aromatic acyl chloride is then added and the mixture agitated at an elevated temperature.

Two competing reactions take place in this method. Most predominant is the reaction between the amine and aromatic acyl chloride to form the amide and HCl, the latter being neutralized by the alkali. The other reaction is the hydrolysis of acyl chloride to the corresponding acid. Both heating and agitation influence these two reactions. By control of these factors, optimum reaction conditions are sought in which the hydrolysis is minimized.

In spite of this control, however, hydrolysis of the aromatic acyl chloride, particularly in commercial scale operations, may be as high as 8–10% and, in some instances, even higher. In operations in which great quantities of reactants are employed, therefore, hydrolysis constitutes a serious loss. Accordingly, there has continued to exist a demand for improving this method of acylating amines and for reducing the loss of acyl chloride by hydrolysis. Particularly is this true when as in some instances the acyl chloride cost substantially equals or exceeds that of the amine, as when, for example, benzoyl chloride is reacted with diaminodiphenyldisulfide. Accordingly, this reaction will be discussed as illustrative herein.

It is an advantage of the present invention that this demand has been met in a simple yet unexpectedly successful manner. In general, this is accomplished in the process of this invention comprises by providing a sufficient concentration of chloride ions in the reaction medium during the late stages of the reaction. In this manner, hydrolysis can be minimized to as little as 1% of the acyl chloride employed.

It has been found, in accordance with this invention, that the greatest amount of hydrolysis occurs in the later stages of the acylation reaction and that the major portion of the reaction period is substantially free of hydrolysis. For example, as little as 0.5% hydrolysis will occur during that period in which about 85–90% of amine is being acylated. During the reaction of the remainder of the amine as much as 10% of the total acyl chloride employed in the reaction may be hydrolyzed.

Numerical limitations of the concentration of chloride ions required to obtain optimum reaction of amine and acyl chloride are difficult to set forth. It may vary somewhat with the particular reactants employed. Usually, however, a concentration as low as 1.5 moles per liter results in a decrease in hydrolysis. Preferably, the reaction should be completed with a concentration of at least about 2 moles per liter during the later stages of the reaction. In practice, the normal procedure would be to acylate the last 10–15% of amine in a medium which is substantially saturated with chloride ions.

This high concentration of chloride ion necessary in the latter stages of the reaction may be provided for in various ways. In the usual manner of conducting the reaction of an amine with the acyl chloride water and sodium chloride form in the aqueous phase but the total water content therein is not such as to provide with the chloride salt formed in situ an adequate chloride ion concentration to obtain the benefits of the present invention. Accordingly, this is supplemented by adding either at the beginning or at some stage of the reaction a sufficient amount of a water soluble chloride salt to provide in the aqueous phase an adequate chloride concentration. The particular chloride salt added is not important but, preferably, it is sodium chloride inasmuch as sodium chloride is also formed in situ.

Another practically desirable way of providing the desired chloride ion concentration is to limit the initial water content of the reaction medium with respect to the sodium chloride to be formed in situ. In this manner, one skilled in the art may readily obtain any desired concentration at any point in the reaction. Obviously, if for some reason it is desired, the chloride ion concentration may be provided for by a combination of these means.

So far as the acylation reaction itself is concerned, it is conducted in a manner well known by those skilled in the art and as fully described in the literature.

The process of this invention is further illustrated by the folowing examples, in which all parts are by weight unless otherwise specified.

*Example 1*

To a reaction medium of 1010 parts of O,O'-diaminodiphenyldisulfide in 4330 parts of toluene and 540 parts of sodium carbonate in 8000 of water are added 130 parts of benzoyl chloride with agitation over a period of 90 minutes, the temperature rising to 70–75° C. In order to complete the reaction and eliminate the presence of free amine, an additional 50 parts of benzoyl chloride is added. After the completion of benzoylation, a sample of the aqueous layer is analyzed and found to contain 6.7 grams of sodium chloride per 100 ml. and to contain benzoic acid corresponding to 8.9% hydrolysis of the benzoyl chloride used.

*Example 2*

The procedure of Example 1 is repeated except that 2020 parts of O,O'-diaminodiphenyldisulfide in 4400 parts of toluene, and 710 parts of sodium carbonate and 620 parts sodium hydroxide in 3950 parts of water are used as the reaction medium. To this is added 2200 parts of benzoyl chloride over a 2 hour period. The reaction is allowed to heat up to 75° C. and is agitated for an additional half hour. In order to complete the reaction, an additional 250 parts of benzoyl chloride is added. After benzoylation is complete, the water layer is found to contain 21.7 grams of sodium chloride per 100 ml. and an amount of benzoic acid corresponding to 0.6% hydrolysis of the benzoyl chloride used.

I claim:

1. In a process for the acylation of an aminoaryl sulfide wherein said sulfide is reacted with a mononuclear aroyl chloride in a two-phase reaction medium comprising as the aqueous phase medium an aqueous solution of a member of the group consisting of alkali-metal hydroxides and alkaline salts thereof and as an organic phase a solution of the sulfide in an organic solvent; the improvement which comprises: after the acylation reaction is from about 85 to about 90% complete adding to the reaction mass a sufficient amount of chloride ions to produce in the aqueous phase a chloride ion concentration of from at least about 1.5 mols per liter to about the saturation concentration and thereafter during the subsequent stages of the acylation reaction maintaining said chloride ion concentration not less than about said 1.5 mols per liter.

2. A process according to claim 1 in which the amount of water present in the aqueous phase medium when said acylation is about 85 percent completed is in such proportion to the amount of alkali-metal chloride salt formed in situ as to provide in said subsequent stages of the reaction a chloride ion concentration of at least about said 1.5 mols per liter.

3. A process according to claim 1 in which said chloride ion concentration in said aqueous phase medium is produced by adding thereto a sufficient amount of alkali-metal chloride salt in addition to that formed in situ.

4. In a process for the acylation of O,O'-diaminodiphenyldisulfide wherein said disulfide is reacted with benzoyl chloride in a two-phase reaction medium comprising as the aqueous phase medium an aqueous solution of a member of the group consisting of sodium hydroxides and alkaline salts thereof and as an organic phase a solution of the disulfide in an organic solvent; the improvement which comprises: after the acylation reaction is from about 85 to about 90% complete adding to the reaction mass a sufficient amount of chloride ions to produce in the aqueous phase a chloride ion concentration of from at least about 1.5 mols per liter to about the saturation concentration and thereafter during the subsequent stages of the acylation reaction maintaining said chloride ion concentration not less than about said 1.5 mols per liter.

5. A process according to claim 4 in which the amount of water present in the aqueous phase medium when said acylation is about 85 percent completed is in such proportion to the amount of sodium chloride salt formed in situ as to provide in said subsequent stages of the reaction a chloride ion concentration of at least about said 1.5 mols per liter.

6. A process according to claim 4 in which said chloride ion concentration in said aqeuous phase medium is produced by adding thereto a sufficient amount of sodium chloride salt in addition to that formed in situ.

References Cited in the file of this patent

UNITED STATES PATENTS

| | | |
|---|---|---|
| 1,857,555 | Laska et al. | May 10, 1932 |
| 2,073,100 | Eisleb | Mar. 9, 1937 |
| 2,137,279 | Haffner et al. | Nov. 22, 1938 |
| 2,159,605 | Schumacher et al. | May 23, 1939 |
| 2,643,965 | O'Brien et al. | June 30, 1951 |
| 2,538,764 | Crooks et al. | Jan. 23, 1957 |

OTHER REFERENCES

Sidgwick "Org. Chem. of Nitrogen," p. 138 (1937), Clarendon Press (London).

Hancock et al.: JACS, vol. 66 (1944), pp. 1738–47.

Glass tone: Textbook of Physical Chem., 1946, pp. 816–818.

Clark et al.: Bio Chem J., vol. 55, page 839 (1953).